United States Patent [19]
Takahashi

[11] Patent Number: 4,902,115
[45] Date of Patent: Feb. 20, 1990

[54] OPTICAL SYSTEM FOR ENDOSCOPES
[75] Inventor: Susumu Takahashi, Tokyo, Japan
[73] Assignee: Olympus Optical Co., Ltd., Tokyo, Japan
[21] Appl. No.: 99,814
[22] Filed: Sep. 22, 1987
[30] Foreign Application Priority Data
  Sep. 22, 1986 [JP] Japan .................................. 61-224536
[51] Int. Cl.$^4$ ......................... G02F 1/13; G02B 13/18; G02B 21/02
[52] U.S. Cl. .................................... 350/449; 350/330; 350/410; 350/414; 350/432; 350/450; 354/227.1
[58] Field of Search ....................... 350/330, 448-450, 350/410, 414, 432-435; 354/227.1

[56] References Cited
U.S. PATENT DOCUMENTS
4,159,864  7/1979  Yasukuni et al. .................... 350/423

FOREIGN PATENT DOCUMENTS
2167010  7/1977  Fed. Rep. of Germany .

Primary Examiner—Scott J. Sugarman
Attorney, Agent, or Firm—Cushman, Darby & Cushman

[57] ABSTRACT

In order to facilitate accommodation into a narrow space and enable to reserve an observation range wider than those conventionally available while assuring high reliability and brightness sufficient for practical use, the optical system for endoscopes comprises a stop capable of varying aperture into plural number of shapes and/or sizes, and a lens system arranged in the vicinity of said stop and designed in such a manner that the lens surface portions corresponding to the varied stop apertures and sizes have focal length different from each other. Said optical system is applicable as an objective lens, relay lens and eyepiece.

34 Claims, 14 Drawing Sheets (I)

(II)

FIG. 9A
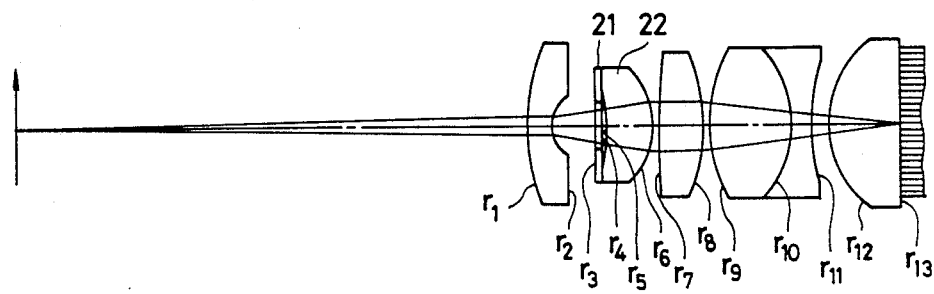
FIG. 9B
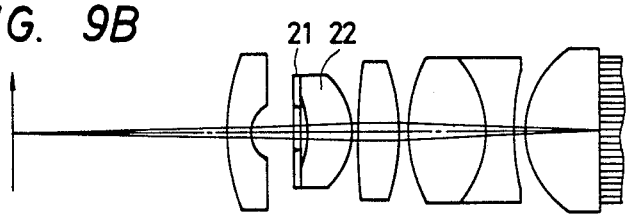
FIG. 10A  FIG. 10B  FIG. 10C
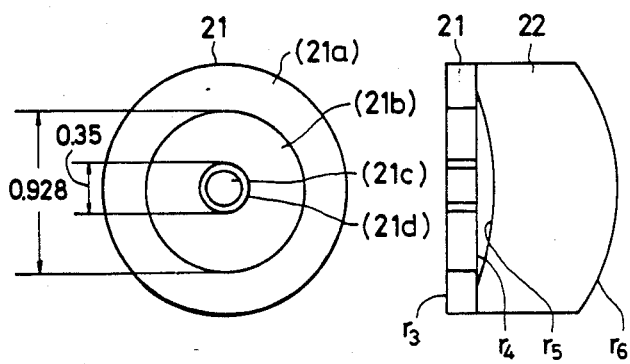 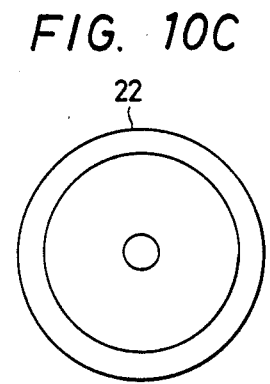

CONTINUOUSLY ADJUSTABLE STOP
(STEPWISE ADJUSTABLE STOP)

OPTICAL SYSTEM FOR ENDOSCOPES

BACKGROUND OF THE INVENTION (a) Field of the invention:

The present invention relates to an endoscope and more specifically to an optical system for endoscopes.

(b) Description of the prior art:

Most of the endoscopes currently provided as medical instruments for practical use are so designed as not to change focus point, stop aperture, focal length, etc. of the optical systems for eliminating complicated procedures during medical operations. In order to observe objects located at relatively long distances from the objective lenses (hereinafter referred to as far positions) as well as objects located as relatively short distances from the objective lenses (hereinafter referred to as near positions) in practice, the aperture stops are preliminarily stopped down to obtain required depth of field. However, brightness and depth of field are in a relationship contradictory to each other: brightness is reduced at larger depth of field, or depth of field is insufficient at higher brightness. Further, in order to realize the close-up observation hitherto and currently demanded or compensate smaller quantity of light in the thinner light guides adopted for the thinner endoscopes, persons in the art widely desire new technological development.

The automatic iris control device is available as a means to satisfy the demand and desire. Since the endoscope forms an object image by using a built-in illuminating means, the image is brighter as the distance from the objective lens to an object (hereinafter referred to as "observation distance") is shorter. The automatic iris control device is used to obtain sufficient quantity of light not by adjusting the quantity of light from the light source, but by adjusting the stop aperture of the objective lens in conjunction with the quantity of incident light. For observation of the nearer position, the automatic iris control device provides a larger depth of field by stopping down the iris and has an advantage by obtaining an image sharper than that obtained without said device. Since it is practically difficult to incorporate the distal end of an endoscope with a mechanism capable of continuously changing the stop aperture, the aperture is changed discontinuously at two or three steps.

A composition of the conventional automatic iris control device is exemplified in FIGS. 1A and 1B. The automatic iris control device consists, as shown in FIG. 1A, of an imaging lens 2 and a solid-state image sensor on the rear side (image side) of a variable stop 1. Shown in FIG. 1B is the variable stop 1 independently. Area $1a$ is always black, whereas area $1c$ is always transparent. Area $1b$ is transparent or black and performs the function of a variable stop.

FIG. 2A illustrates a fully opened state (I) and FIG. 2B illustrates a stopped-down state (II) respectively of the variable stop. FIG. 3 visualizes the relationship between the F number and the depth of field at operation time of the automatic iris control device.

An endoscope equipped with no automatic iris control device provides only the depth of field in the state (I). When an endoscope equipped with the automatic iris control device is set for observing the nearer position, the object is illuminated brighter and the iris is stopped down into the state (II) to properly adjust the quantity of light, thereby increasing the depth of field and widening the observation field.

However, the automatic iris control device stops down the iris only when observing the near position and provides no advantage for elongating the depth of field when observing the farther position. Since elongation Δ of the depth of field on the near position side is quite insufficient, it can hardly be said that the automatic iris control device remarkably widens the practical observation range. Therefore, it was attempted to remarkably widen the practical observation range by adjusting the focus point of the objective lens onto the nearer position simultaneously with a stop-down of the iris so as to make useless the depth of field on the far position side.

For adjustment of the focus point, several methods have conventionally been contrived. For example, the position of the lens 2 is changed as shown in FIG. 4 by displacing said lens using an electromagnetic force or piezoelectric element. Further, methods have also been contrived to displace the solid-state image sensor or end surface of the image guide for changing the focus point.

However, it is difficult to build a mechanism for such displacement into a thin fiber bundle of an endoscope and focus point adjusting systems comprising a driving circuit are generally unreliable.

SUMMARY OF THE INVENTION

A primary object of the present invention is to provide an optical system easily accommodatable into a thin fiber bundle of endoscopes, etc., assuring high reliability and the capability to provide an observation range wider than those conventionally available while reserving brightness sufficient for practical use.

Another object of the present invention is to provide an optical system for endoscopes capable of forming images brighter than those conventionally available.

According to the present invention, these objects can be accomplished by equipping an optical system for endoscopes with a stop capable of changing the stop aperture into plurality of shapes and sizes, and a lens system arranged at a position neighboring the stop or substantially conjugate with the stop and formed in such a manner that the lens surface portions corresponding to different shapes and sizes of the stop apertures have focal lengths different from each other. Accordingly, the present invention eliminates the necessity to displace the lens, solid-state image sensor, etc.

Speaking concretely, the optical system for endoscopes according to the present invention is characterized in that it comprises a stop having a portion always transmitting light and at least one portion switchable to transparent state or light-shielding state or a stop having at least two portions switchable to transparent or light-shielding state, and a lens surface arranged at the position of the stop or a position optically conjugage therewith and including at least two portions having different focal lengths or different radii of curvature.

The optical system for endoscopes according to the present invention is capable of properly reducing the quantity of light, for observing the near position, and simultaneously focusing on the near position while increasing depth of field by the stop effect. Owing to these capabilities, the optical system according to the present invention can provide an observation range wider than those conventionally available while reserving brightness sufficient for practical use.

Further, the optical system for endoscopes according to the present invention has the same depth of field on the side of the far position both for observations of the far and near positions. This feature makes it possible to reserve an observation range sufficient for practical use and obtain images brighter than those conventionally available.

Furthermore, the optical system for endoscopes according to the present invention permits changing the focal point without changing the position of the solid-state image sensor by cooperating with the automatic iris control device. This feature will accommodate an optical system arranged into a thin fiber bundle of endoscopes, etc. and will enhance operating reliability.

These and other objects as well as the features and advantages of the present invention will be apparent from the following detailed description of the preferred embodiments when taken in conjunction with the accompanying drawings.

BRIEF DESCRIPTION OF THE DRAWINGS

FIGS. 9A and 9B, and FIGS. 10A, 10B and 10C are sectional views and front elevations illustrating composition and main parts of a first embodiment of the present invention;

DESCRIPTION OF THE PREFERRED EMBODIMENTS

Figure 1A:
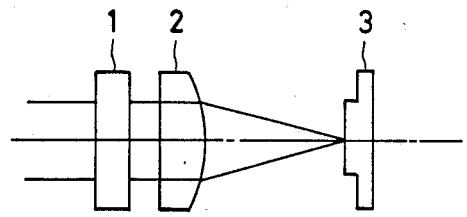
FIGS. 1A and 1B, FIG. 2A and 2B and FIG. 3 are diagrams illustrating the composition, operating states and variation of depth of field of the conventional optical system for endoscopes.
Figure 1B:
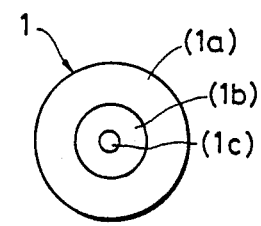
Figure 2A:
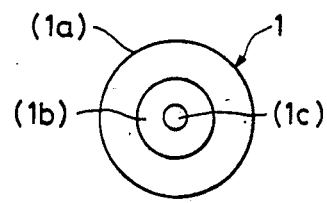
Figure 2B:
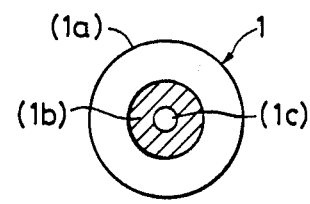
Figure 5A:
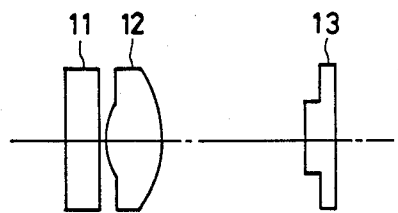
FIGS. 5A and 5B, FIGS. 6A through 6B, and FIG. 7 are diagrams illustrating the fundamental composition, operating states and variation of depth of field of the optical system for endoscopes according to the present invention.
Figure 5B:
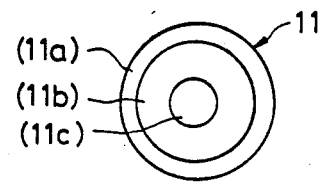

The fundamental composition of the optical system for endoscopes according to the present invention is illustrated in FIGS. 5A and 5B wherein the reference numeral 11 represents a variable stop consisting, as shown in FIG. 5B, of a portion 11a always kept in a light-shielding state, and portions 11b and 11c which are switched to transparent and light-shielding states respectively reverse to each other by the driving means shown in FIG. 2B. The reference numeral 12 designates a lens having two focal lengths corresponding to the two states respectively of the stop 11, the central portion of the incident surface being convex and circumferential portion thereof being flat. The reference numeral 13 denotes a solid-state image sensor.

FIGS. 6A through 6F visualize operating states of the optical system for endoscopes according to the present invention. In the state (I), the optical system has a focal length, an F number and depth of field which are similar to those of the ordinary optical system for endoscopes. Out of the portions of the variable stop 11, only 11b is kept transparent and rays having passed through this portion transmit through the circumferential portion having a focal length f of the lens 12 to form an image on the solid-state image sensor. The state (II) corresponds to a case where an object to be observed is brought nearer the lens 12 and illuminated brightly, and only the portion 11c of the variable stop 11 is made transparent whereas the portion 11b so far transparent is set in the light-shielding condition by operation of the driving circuit shown in FIG. 2B. In this state, since the area of the portion 11c is set sufficiently smaller than that of the portion 11b, the quantity of light is reduced sufficiently for preventing the light from increasing due to the approach of the object to be observed in the state (II). Simultaneously, the stop aperture is minimized to enlarge the F number and increase the depth of field. In addition to this effect which is almost the same as that available with the conventional automatic iris control device, the switching of the variable stop 11 causes a change in the optical path in the lens 12 and a shortening of the focal length, thereby bringing the object to be observed into focus. Accordingly, the object brought nearer can be observed with a larger depth of field. Since brightness is adjusted simultaneously, the object is observed at a suitable brightness. FIG. 6G shows an example of a driving circuit for switching between the state (I) and state (II). Explanation will be made on an assumption that the variable stop 11 consists of an electrochromic element. One surface of this element is designed as a common transparent electrode which is grounded, and the ring portion 11b is connected by the transparent electrode to the output terminal of the solid-state image sensor 3 through an integrating circuit 131, a comparator 132 and a buffer amplifier 133, whereas central circular portion 11c is connected by the transparent electrode to the output terminal of the comparator 132 through an inverter 134 and a buffer amplifier 135. The integral of output signals from the solid-state image sensor 13 is varied in conjunction with the brightness of an object image. Since an endoscope forms a bright image for an object at the near position or a dark image for an object at the far position, an integral obtained with the integrating circuit 31 is compared with a preliminarily set standard value by the comparator 132. When the integral is larger than the standard value, the output from the comparator is judged as "High", a driving voltage is applied to the ring-shaped portion 11b through the buffer amplifier 135, thereby setting the said portion to the light-shielding condition. On the other hand, since said output is inverted by the inverter 134, the voltage applied to the central circular portion 11c is reduced, thereby setting said portion in the transparent condition. When said integral is smaller than the standard value, in contrast, the output of the comparator 132 is judged as "Low" and the driving voltage is applied to the central circular portion 11c, thereby setting this portion in the light-shielding condition and the ring-shaped portion 11b in the transparent condition.

Figure 3:
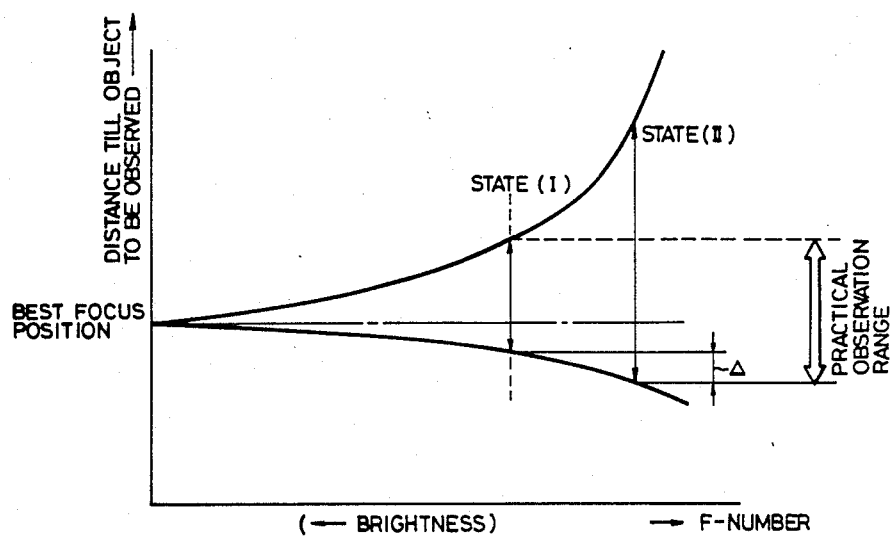
Figure 4:
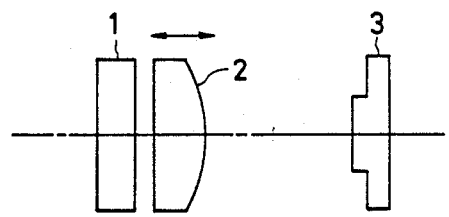
FIG. 4 is a sectional view illustrating another composition of the optical system for endoscopes.
Figure 7:
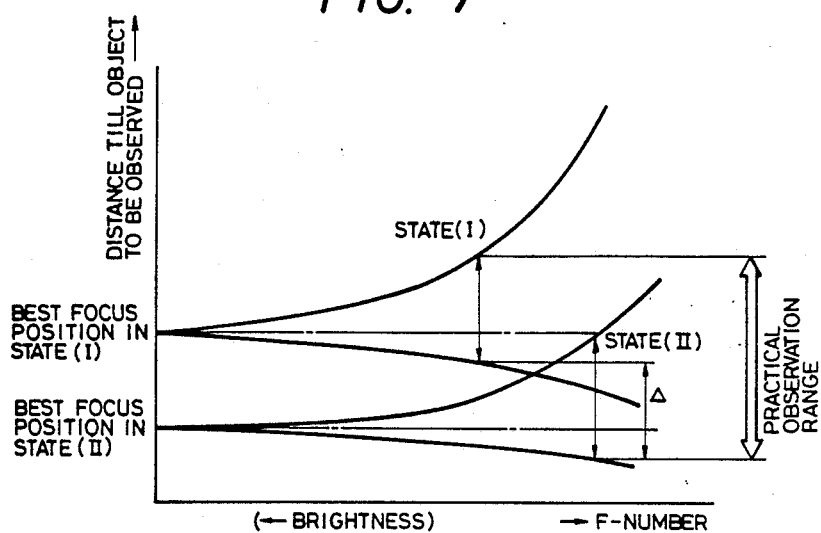

Practical observation ranges are visualized in FIG. 7. In the state (I), the observation range is nearly the same as that in the conventional example (state (I) in FIG. 3), though the quantity of light is a little smaller in the optical system according to the present invention than that in the conventional example.

In the state (II), however, the optical system according to the present invention changes the focal length and widens the observation range on the side of the near position in contrast to the conventional example which broadens the observation range only by Δ toward the objective lens. Taking into consideration the observation ranges as a whole obtainable in the state (I) and state (II), the optical system according to the present invention remarkably widens the practical observation range as compared with the conventional example. In addition, reduction in the quantity of light due to light shielding by the central portion of the stop is only slight since the diameter of the portion 11c is sufficiently smaller than the outside diameter of the portion 11b for enlarging the depth of field. Therefore, brightness in the optical system according to the present invention is not inferior for practical use to that in the conventional example.

Figure 6A:
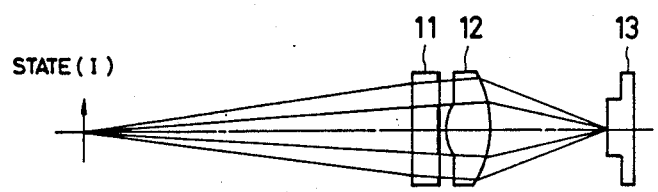
Figure 6B:
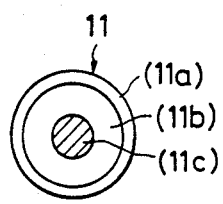
Figure 6C:
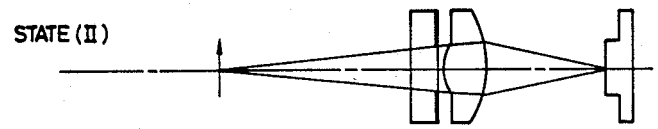
Figure 6D:
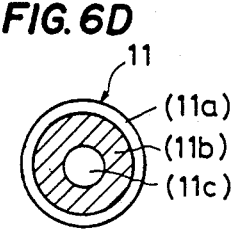
Figure 6E:
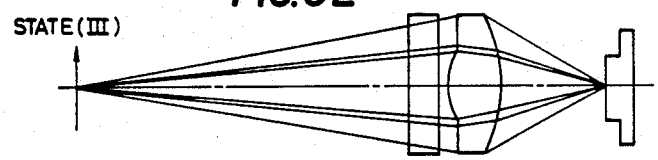
Figure 6F:
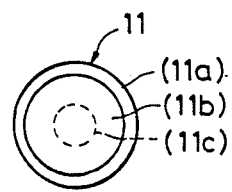
Figure 6G:
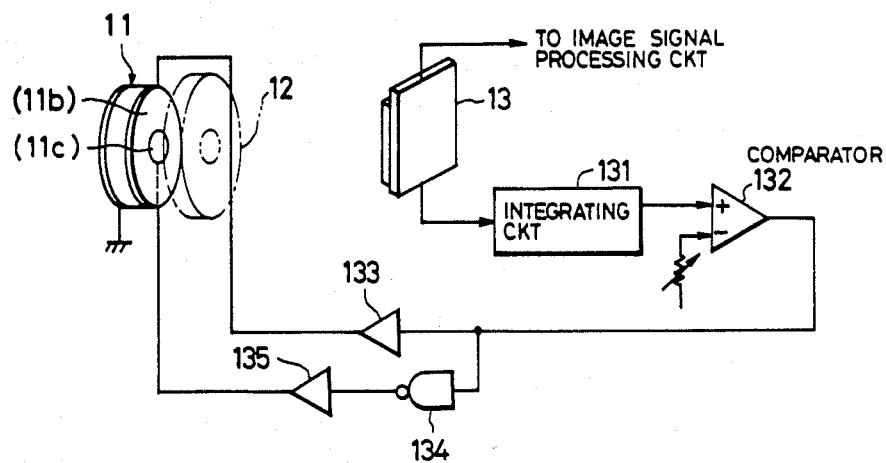

Further, when the distance from the object lens to an object at farther position in the state (II) is set equal to or longer than the distance to the far position in the state (I) to bring objects at farther positions into focus, images are not aggravated and loss in the quantity of light is quite the same as that in the conventional example even when the portion 11c of the variable stop 11 is made transparent to set the stop aperture in the shape shown in FIGS. 6E and 6F (state III).

The similar effect can be obtained by developing this concept, i.e., designing the variable stop so as to be switchable in multiple steps and arranging lenses at multiple stages to make uniform the far positions of depth of field in various states. Furthermore, it is possible to combine a stop capable of continuously varying its aperture with a non-spherical lens having continuously varying focal lengths. Moreover, the above-mentioned effect can be obtained by combining a non-spherical lens having continuously varying focal lengths with a stop capable of varying aperture size continuously. Therefore, the variable stop 11 may be of the electrochromic type, mechanical type or iris capable of continuously varying aperture size mechanically.

Now, detailed description will be made on the optical system for endoscopes according to the present invention equipped with a stop capable of switching aperture size in two steps for selecting a transparent portion and light-shielding portion alternatively. Concrete numerical values will be used for description.

For example, let us consider a thin single-element lens having a fixed focal length and specified as follows:
f=1 mm
NA'=0.25
Diameter of confusion circle: 20 μm
Most favorable distance from objective: 16.2 mm On the other hand, let us take an example of the conventional automatic iris control device switchable to vary NA' from 0.25 to 0.10. Then, depth of field is:

|  | Far position | Most favorable distance from objective | Near position | Brightness ratio |
| --- | --- | --- | --- | --- |
| At NA' = 0.25 | 40 mm | 16.23 mm | 10.46 mm | 1 |
| At NA' = 0.10 | ∞ | 16.23 mm | 7.03 mm | 0.16 |

If brightness is sufficient, the stop is switched before the objective lens is brought very near an object to be observed and the endoscope permits observation with a larger depth of field, thereby posing no problem. If brightness is rather insufficient, in contrast, the stop is not switched after the objective lens is brought near an object to be observed (when stop aperture is varied in conjunction with brightness), thereby making depth of field insufficient at the near position and producing a disadvantageous tendency. Therefore, it is sufficient here to check the latter case wherein brightness is rather insufficient.

Figure 8A:
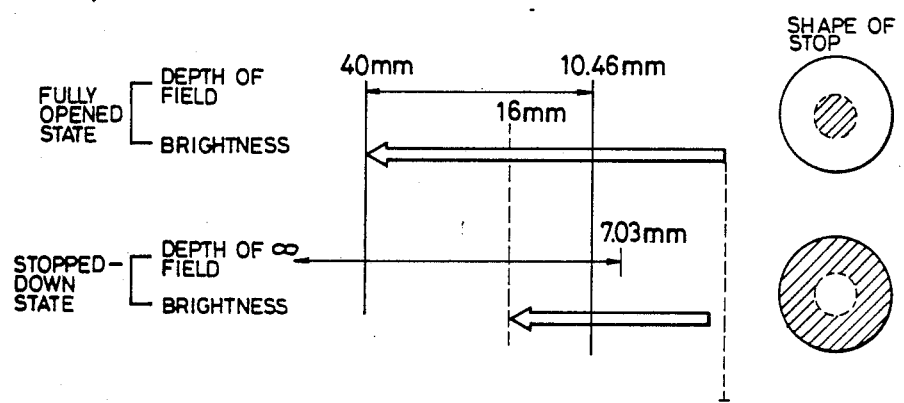
FIGS. 8A and 8B are diagrams illustrating variation of depth of field obtainable with the automatic iris control device of a two-step switching type.
Figure 8B:
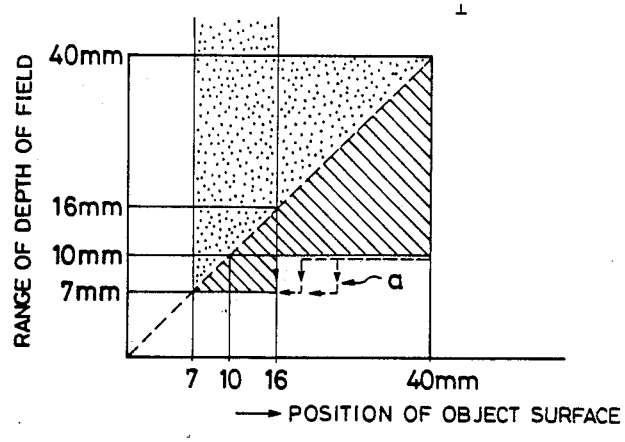

Let us assume, in this case, that a distance of 40 mm is a lower limit for obtaining required brightness taking into consideration reflectivity of the object to be observed, brightness of the illumination system and sensitivity of the image pickup portion. The ratio between brightness at NA'=0.25 and that at NA'=0.10 is $(0.10/0.25)^2=0.16$, and a distance to make brightness (1/0.16) times as high is $40 \text{ mm} \times \sqrt{0.16} = 16$ mm. That is to say, when the stop is switched at a distance of 16 mm as measured from the objective lens to an object to be observed, the quantity of light after stopdown corresponds to the brightness at a distance of 40 mm as measured from the objective lens to an object to be observed. This is visualized in FIGS. 8A and 8B. On the basis of these diagrams, the object is observed with depth of field kept at 40 to 10.5 mm, and the stop is stopped down at a distance of 16 mm. Accordingly, depth of field is widened to a range of 7.04 mm ~ ∞ and brightness at the distance of 16 mm is lowered to that at 40 mm. Within the distance range of 16 to 7.04 mm, the object is observed with depth of field of 7.04 mm ~ ∞. In addition, the dashed line a in FIG. 8B indicates a fact that when an object has a reflectivity higher than that assumed, the stop is switched earlier and a sufficient depth of field is easily obtained on the side of the near position. Described above is an example of the optical system according to the present invention equipped with the conventional automatic iris control device switchable in two steps.

Then, depth of field of the above-described conventional example will be compared with the following specification example (1) and specification example (2), taking the quantity of light passing through the ring-shaped stop at a distance of 40 mm as a lower limit.

|  | Specification example (1) | Specification example (2) |
| --- | --- | --- |
| Circumferential portion NA = 0.25~0.10 | f = 1 mm | f = 1 mm |
|  | Confusion circle 20 μm | Confusion circle 20 μm |
|  | Most favorable distance from objective 16.2 mm | Most favorable distance from objective 16.2 mm |
|  | Depth of field 40~10.46 mm | Depth of field 40~10.46 mm |

-continued

|  | Specification example (1) | Specification example (2) |
| --- | --- | --- |
| Central portion NA × 0.10~0 | f × 0.910 mm | f × 0.940 mm |
|  | Confusion circle 20 μm | Confusion circle 20 μm |
|  | Most favorable distance from objective 6.67 mm | Most favorable distance from objective 8.18 mm |
|  | Depth of field 16.10~4.17 mm | Depth of field 40~4.9 mm |

In the specification example (1), an object is observed with depth of field of 40 to 10.4 mm within a distance range of 40 to 16 mm, and the stop is switched at a distance of 16 mm to set the quantity of light equal to that at a distance of 40 mm. Further, within a distance range of 16 to 4.17 mm, an image is observable on the side of the near position with a depth of field remarkably longer than that in the conventional example.

However, when an object has a high reflectivity, the stop is switched by the automatic iris control device before the object lens is brought to a distance of 16 mm from an object to be observed. When the stop is switched at a distance of 20 mm, for example, the object cannot be observed since it is located outside the range of depth of field 16 to 4.17 mm for the rays passing through the central portion of the stop. In the specification example (1), observation is impossible in a certain range when the reflectivity of the objects remarkably varies.

In order to correct this defect, it is necessary to reduce the quantity of light depending on reflectivity of the observed objects with rays passing through the circumferential portion of the stop. In case of an electronic scope, for example, it is sufficient to judge image contrast, reduce the quantity of light necessary to obtain an image of good quality and switch the stop for using the rays passing through the circumferential portion.

It is originally impossible to adjust the quantity of light delicately with the stop switchable in two steps by developing this concept in this direction. Since the original demand was to adjust the quantity of light by varying the brightness of a light source, brightness should be adjusted so as to obtain favorable images by adequately varying the stop aperture and adjusting the quantity of light from a light source in conjunction with the distance from the objective lens to an object and the reflectivity of the object.

On the other hand, the specification example (2) far position of the depth of field for the rays passing through the central portion of a stop with that for the rays passing through the circumferential portion of the stop. When this example is set in such a manner that brightness at a distance of 40 mm is sufficient for an object having the minimum reflectivity assumed, objects having higher reflectivities are free from the problem encountered in the specification example (1).

Depth of field has been discussed above with reference to the specification examples (1) and (2). Speaking generally of brightness in the optical system according to the present invention, it has a defect that quantity of light is 16% smaller than that in the conventional example when the rays passing through the ring-shaped stop are used to form an image while cutting off the rays passing through the central portion. However, this defect can be corrected by widening the outer circumference of the ring-shaped stop to obtain NA′=0.27. When the most favorable distance from the objective is set at 17 mm, depth of field is 11.05~17~40 mm, i.e., the depth of field on the side of the near position is nearly equal to that in the conventional example. It is therefore possible to realize specifications assuring a wider observation range while reserving the same quantity of light as that in the conventional example.

Now, the present invention will be described in detail with reference to the concrete embodiments shown in the accompanying drawings.

Shown in FIGS. 9A and 9B is a first embodiment of the present invention applied to an objective system of an ordinary type of endoscope wherein a variable stop 21 consisting of an electrochromic element is arranged before a meniscus concave lens 22 having a different curvature between the central portion and circumferential portion of the concave surface. FIG. 9A shows a state where a portion 21b of the stop 21 is kept transparent. (See FIG. 10A) FIG. 9B illustrates a state where portion 21c of the stop 21 is kept transparent and rays pass through the central portion having small curvature of the meniscus concave lens 22, thereby focusing the objective lens system on a position nearer the objective lens than the state shown in FIG. 9A. As is apparent from the drawings, the double-focal-point lens 22 is arranged in the vicinity of the stop 21 for the following three reasons: (1) When a multi-focal-point lens is arranged on the stop surface, images are not deformed at any image height. In other words, if the multi-focal-point lens is set apart from the stop, rays pass through the lens at different heights and the focal length is varied depending on the image height, thereby deforming the images. (2) When a multi-focal-point lens is arranged on the stop surface, the field angle is kept constant, thereby providing an advantage for practical use. If field angle is largely varied between observations of the far position and the near position, image magnification is remarkably changed, thereby constituting remarkable inconvenience in practical use. Field angle is determined by the principal ray. Since height of the principal ray at the stop position is zero, no influence is caused on the principal ray by arranging a multi-focal-point lens at this position. That is to say, field angle is not changed by variation of focus point. (3) In case of the optical system which also makes the central portion of the stop transparent to increase the quantity of light without using the ring-shaped stop for observation of the far position, only the focus point is varied without causing positional shift on the image plane, the stop can be used in the fully open condition since field angle is kept constant, and the image is not deformed depending on image height as described above. This point will be discussed in details with reference to the subsequent embodiments.

FIG. 10A shows the shape of the variable stop 21. Arranged between the portion 21b and the portion 21c is a ring-shaped light-shielding portion 21d which is always kept opaque. Since an airspace is reserved between the stop 21 and the lens surface, the portion 21c serves to prevent the offaxial rays transmitting through the portion 21c from passing around the circumference of the lens 22. FIG. 10B shows side views of the stop 21 and lens 22. As illustrated in FIG. 10C, the central portion of the lens 22 has a small radius of curvature.

The circumferential portion is a concave surface having a large radius of curvature correspondingly to the portions of the stop 21.

Design numerical data will be listed below for the Embodiment 1 and modifications thereof:

Embodiment 1
(For observation at the far position)

$r_1 = 3.7225$
$d_1 = 0.4320$    $n_1 = 1.58913$    $\nu_1 = 60.97$
$r_2 = 0.5756$
$d_2 = 0.4320$
$r_3 = \infty$
$d_3 = 0.5076$
$r_4 = \infty$
$d_4 = 0.0648$
$r_5 = -3.1771$
$d_5 = 0.8531$    $n_2 = 1.69680$    $\nu_2 = 55.52$
$r_6 = -1.3413$
$d_6 = 0.0972$
$r_7 = 11.6436$
$d_7 = 0.7991$    $n_3 = 1.69680$    $\nu_3 = 55.52$
$r_8 = -3.2160$
$d_8 = 0.0972$
$r_9 = 3.1382$
$d_9 = 1.5011$    $n_4 = 1.61800$    $\nu_4 = 63.38$
$r_{10} = -1.6890$
$d_{10} = 0.3780$    $n_5 = 1.84666$    $\nu_5 = 23.90$
$r_{11} = 4.4406$
$d_{11} = 0.2592$
$r_{12} = 1.7397$
$d_{12} = 1.3391$    $n_6 = 1.51633$    $\nu_6 = 64.15$
$r_{13} = \infty$
Distance from objective to object −14.8 mm
f' 1 mm
$f_F$ (Front focal length) 0.711 mm
NA' 0.25~0.10
Diameter of confusion circle 20 μm
Depth of field 8.86~40.15 mm (For observation at the near position)

$r_1 = 3.7225$
$d_1 = 0.4320$    $n_1 = 1.58913$    $\nu_1 = 60.97$
$r_2 = 0.5756$
$d_2 = 0.4320$
$r_3 = \infty$
$d_3 = 0.5076$
$r_4 = \infty$
$d_4 = 0.0648$
$r_5 = -3.6828$
$d_5 = 0.8531$    $n_2 = 1.69680$    $\nu_2 = 55.52$
$r_6 = -1.3413$
$d_6 = 0.0972$
$r_7 = 11.6436$
$d_7 = 0.7991$    $n_3 = 1.69680$    $\nu_3 = 55.52$
$r_8 = -3.2160$
$d_8 = 0.0972$
$r_9 = 3.1382$
$d_9 = 1.5011$    $n_4 = 1.61800$    $\nu_4 = 63.38$
$r_{10} = -1.6890$
$d_{10} = 0.3780$    $n_5 = 1.84666$    $\nu_5 = 23.90$
$r_{11} = 4.4406$
$d_{11} = 0.2592$
$r_{12} = 1.7397$
$d_{12} = 1.3391$    $n_6 = 1.51633$    $\nu_6 = 64.15$
$r_{13} = \infty$
Distance from objective to object −5.4 mm
f' 0.985 mm
$f_F$ 0.714 mm
NA' 0.10~0
Diameter of confusion circle 20 μm
Depth of field 3.03~15.81 mm In the variable stop 21, the outer and inner circles of the ring-shaped stop 21b correspond to NA'=0.25 and NA'=0.10 respectively. The portions of the variable stop 21 have the diameters specified in FIG. 10A. The surface represented by $r_5$ of the lens 22 facing the stop 21 has radii of curvature of 3.6828 mm at the central portion and 3.1771 mm at the circumferential portion. This embodiment corresponds to the above-described specification example (1) (depths of field are not equalized on the side of the far position). In addition, when the optical system is stopped down so as to obtain an F number of 5 (NA'=0.10) by using the conventional type of automatic iris control device, depth of field is 5.36 mm~∞ which is shallower than 3.03 mm obtained on the side of the near position by the Embodiment 1 of the present invention.

Embodiment 2
(For observation at the far position)

$r_1 = 3.7225$
$d_1 = 0.4320$    $n_1 = 1.58913$    $\mu_2 = 60.97$
$r_2 = 0.5756$
$d_2 = 0.4320$
$r_3 = \infty$
$d_3 = 0.5076$
$r_4 = \infty$
$d_4 = 0.0648$
$r_5 = -3.1771$
$d_5 = 0.8531$    $n_2 = 1.69680$    $\nu_2 = 55.52$
$r_6 = -1.3413$
$d_6 = 0.0972$
$r_7 = 11.6436$
$d_7 = 0.7991$    $n_3 = 1.69680$    $\nu_3 = 55.52$
$r_8 = -3.2160$
$d_8 = 0.0972$
$r_9 = 3.1382$
$d_9 = 1.5011$    $n_4 = 1.61800$    $\nu_4 = 63.38$
$r_{10} = -1.6890$
$d_{10} = 0.3780$    $n_5 = 1.84666$    $\nu_5 = 23.90$
$r_{11} = 4.4406$
$d_{11} = 0.2592$
$r_{12} = 1.7397$
$d_{12} = 1.3391$    $n_6 = 1.51633$    $\nu_6 = 64.15$
$r_{13} = \infty$
Distance from objective to object −14.8 mm
f' 1 mm
$f_F$ 0.711 mm
NA' 0.25~0.10
Diameter of confusion circle 20 μm
Depth of field 8.86~40.15 mm (For observation at the near position)

$r_1 = 3.7225$
$d_1 = 0.4320$    $n_1 = 1.58913$    $\nu_1 = 60.97$
$r_2 = 0.5756$
$d_2 = 0.4320$
$r_3 = \infty$
$d_3 = 0.5076$
$r_4 = \infty$
$d_4 = 0.0648$
$r_5 = -3.4770$
$d_5 = 0.8531$    $n_2 = 1.69680$    $\nu_2 = 55.52$
$r_6 = -1.3413$
$d_6 = 0.0972$
$r_7 = 11.6436$
$d_7 = 0.7991$    $n_3 = 1.69680$    $\nu_3 = 55.52$
$r_8 = -3.2160$
$d_8 = 0.0972$
$r_9 = 3.1382$
$d_9 = 1.5011$    $n_4 = 1.61800$    $\nu_4 = 63.38$
$r_{10} = -1.6890$
$d_{10} = 0.3780$    $n_5 = 1.84666$    $\nu_5 = 23.90$
$r_{11} = 4.4406$
$d_{11} = 0.2592$
$r_{12} = 1.7397$
$d_{12} = 1.3391$    $n_6 = 1.51633$    $\nu_6 = 64.15$
$r_{13} = \infty$
Distance from objective to object −7.2 mm
f' 0.990 mm
$f_F$ 0.713 mm
NA' 0.10~0
Diameter of confusion circle 20 μm
Depth of field 3.66~40.36 mm The variable stop 21 has the same shape as that described with reference to the Embodiment 1. (See FIG. 10A)

The surface represented by a reference symbol $r_5$ of the lens 22 has a small radius of curvature of 3.477 mm at the central portion corresponding to the inner circle 21c and a radius of curvature of 3.1771 mm at the circumferential portion corresponding to the ring-shaped portion 21b located between the outer and inner circles. This embodiment corresponds to the above-described specification example (2) (where depths of field are uniformalized on the side of the far position).

In addition, when the optical system is stopped down to obtain an F number of 5 ($NA'=0.10$) by using the conventional type of automatic iris control device, depth of field is 5.36 mm~∞ which is shallower than 3.66 mm obtained on the side of the near position in this embodiment.

Description has been made above on the variable stop 21 for switching between the ring-shaped portion 21b and central circular portion 21c.

Figure 11A:
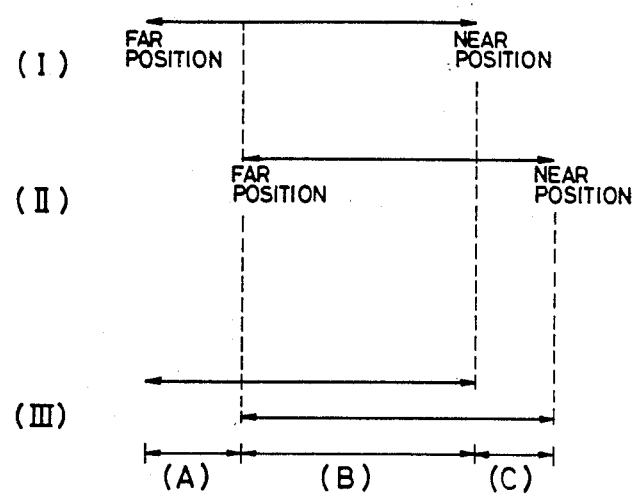
FIGS. 11A, 11B, 11C, 11D, 12A, 12B, 13, 14A, 14B and 14C are diagrams illustrating the problems encountered when the stop is opened on the side of the far position.
Figure 11B:
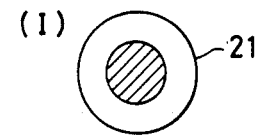
Figure 11C:
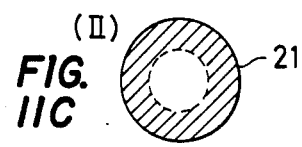
Figure 11D:
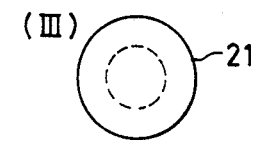

Described below is a stop 21 of a type which is kept in the open condition (III) shown in FIGS. 11A and 11D on the side of the far position and in the stopped-down condition shown in FIGS. 11A and 11C on the side of the near position. The stop of this type has advantages of increasing the quantity of light on the side of the far position and simplifying the composition of the stop itself. However, since the objective system uses a double-focal-point lens, the focus point may be different between an image formed by the rays passing through the circumferential portion of the lens and another image formed by the rays passing through the central portion of the lens. Thus favorable images may not be obtained on the side of the far position due to the shift caused by the difference in image magnification deriving from the variation in field angle or shift due to image deformation. Further, a blurred image may be formed due to overlapping of an image out of focus at the near position with an image in good focus at the far position caused by shift of the focus point. This point will be discussed in the following concrete example.

Figure 12A:
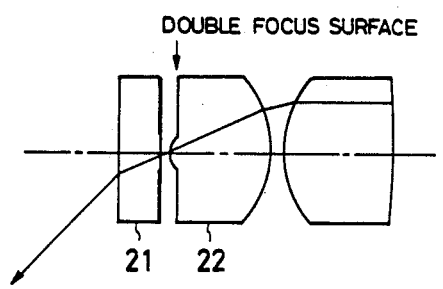
Figure 12B:
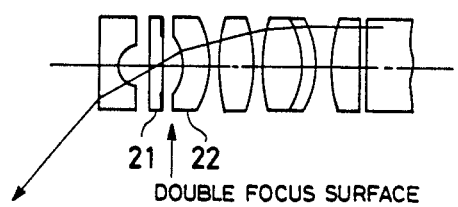

First, as for the shift due to the difference in image magnification deriving from the variation of field angle and the shift of image caused by image deformation. Such image shift is scarcely produced since the lens surface for forming double focal points of the lens 22 is arranged in the vicinity of the stop 21. That is to say, since the lens surface for forming the double focal points is located in the vicinity of the stop 21 in either type of the objective lens system for general endoscopes shown in FIG. 12A (two plano-concave lenses type) or in FIG. 12B (retro-focus type), the offaxial principal ray determining the field angle passes through the lens surface at a height of about zero and the lens surface can give no influence on the inclination of the principal ray. In other words, variation of curvature or focal length of this lens surface gives no influence on the field angle, and magnification accordingly. Further, since rays at all heights pass through the same lens surface, image is not deformed by the lens surface having the double focal points. This lens surface changes the focus point only.

Then, discussion will be made on shift of the focus point. When depth of field obtained in the far position observation state (I) where rays pass through the ring-shaped portion of the stop 21 is compared with the depth of field in the near position observation state (II) where the rays pass through the central portion shown in FIGS. 11B through 11D, for example, in the objective system described above, let us assume that the far position in the near position observation state (II) is nearer the objective lens than the far position in the far position observation state (I). If the stop 21 is used in its open condition in the far position observation state (III), an image formed by the rays passing through the ring-shaped portion is overlapped with the image formed by the rays passing through the central portion to form a composite image at the image forming position. Since an image out of focus in the near position observation state (II) overlaps with the image in good focus in the near position observation state (II) in this case, the composite image is blurred as a whole in the range A in FIG. 11A. That is to say, the original depth of field is cancelled out and disadvantage is made more remarkable though the quantity of light can be increased. As for an image obtained in the range C, a blurred image overlaps with an image in good focus like the image obtained in the range A, and the composite image is blurred as a whole. However, no defect or advantage is produced since an image is blurred in this range even in the far position observation state (I). In the range B, an image in good focus in the far position observation state (I) overlaps with an image in good focus in the near position observation state (II), thereby forming an image in good focus. This will be described below using the concept of the allowable confusion circle and the accompanying drawings.

Figure 13:
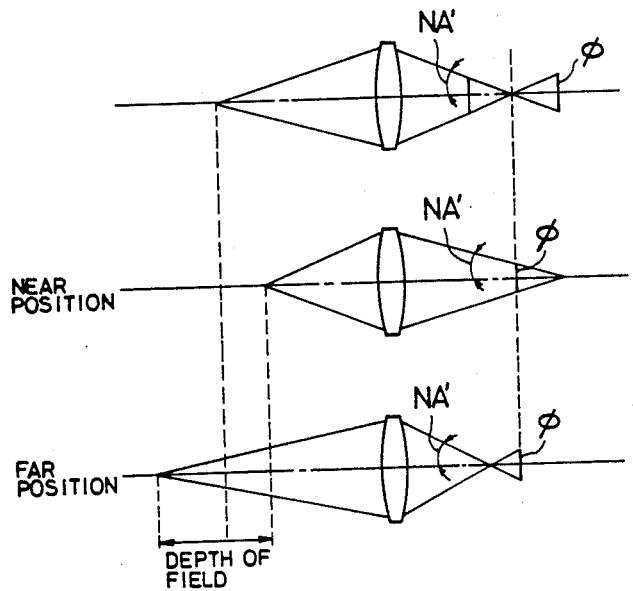
Figure 14A:
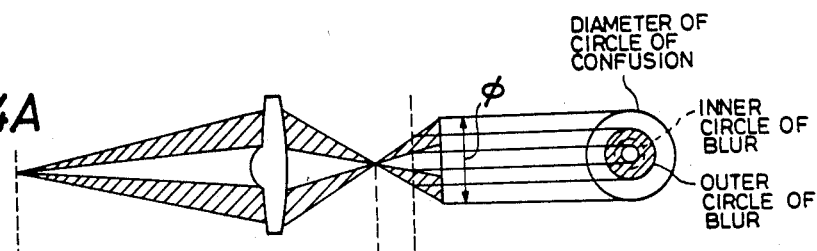
Figure 14B:
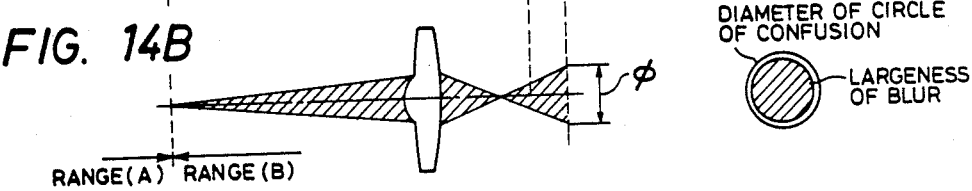
Figure 14C:
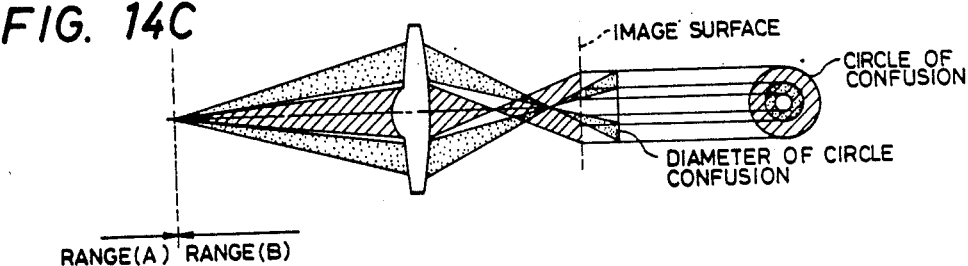

The depth of field originally means a range on the object side of an allowable confusion circle containing out-of-focus images on the image plane, produced by shift of the regular focus point in the back-forth direction. By using NA on the image plane and diameter of confusion circle $\phi$, the depth of field is expressed as shown in FIG. 13. When an image out of focus is located within the range of diameter of confusion circle, it can be regarded as an image in focus. By applying this concept to the far position side of the range B (point in contact with the range A), the depth of field is expressed as shown in FIGS. 14A through 14C. That is to say, in the far position observation state (I), the range of blurring on the image plane is a ring having a diameter smaller than that of the confusion circle (FIG. 14A) since the rays passing through the ring-shaped portion of the stop are within the depth of field. (See FIG. 14A) In the near position observation state (II), on the other hand, the rays passing through the central circular portion reach the limit on the far position side and the range of blurring has the same diameter as that of the confusion circle. Both the ranges are summarized in FIG. 14C wherein both the blurring ranges are within the confusion circle, and an object located on the far position side in the range B is within the depth of field and can be observed without blurring. On the near position side in the range B (point in contact with the range C), the blurring range in the far position observation state (I) coincides with the confusion circle, and the blurring range in the near position observation state (II) is within the confusion circle. Also in this case, overlap of the two ranges is not larger than the confusion circle and an object located within the range B can be observed without blurring.

Figure 15:
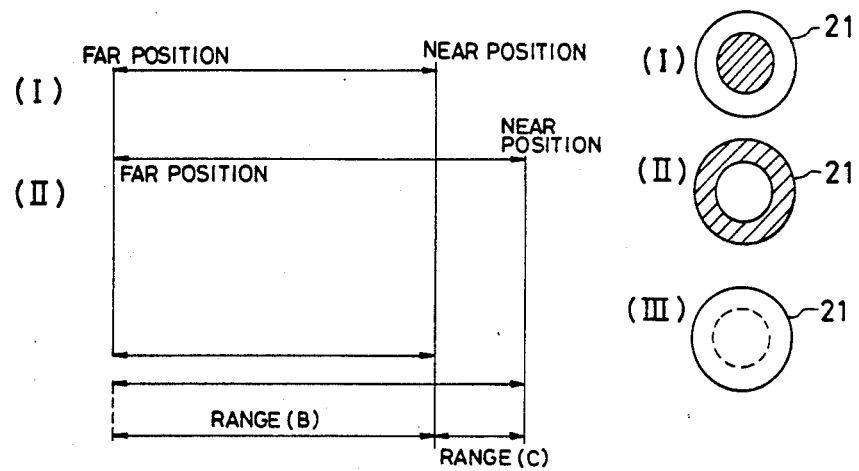
FIGS. 15, 16A, 16B, 16C, 17 and 18 are diagrams descriptive of the means to solve the above-mentioned problems (a third embodiment of the present invention)
Figure 16A:
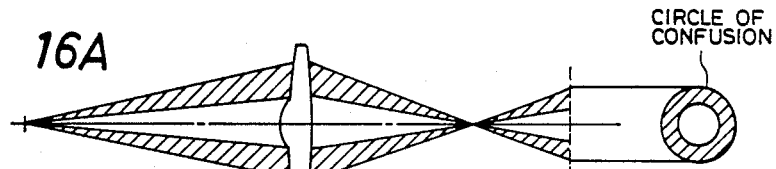
Figure 16B:
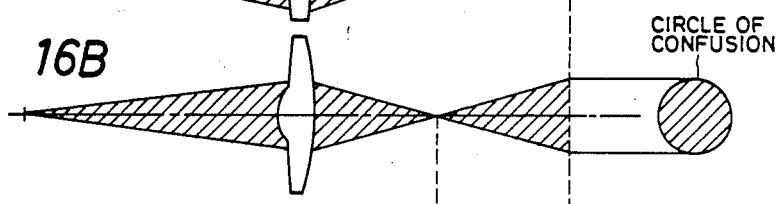
Figure 16C:
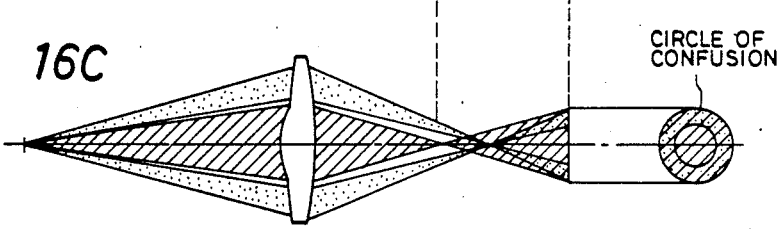

As is understood from the foregoing description, keeping the stop in the fully open condition is effective to increase the quantity of light, but produces blurring in the range A out of the ranges A and B which are so far located within the depth of field, thereby defeating the original purpose to increase the depth of field. In order to correct this defect or to reserve a sufficient depth of field while increasing the quantity of light, the following design concepts are adopted. That is to say, the range of depth of field on the far position side in the near position observation state (II) is determined so as to reserve the range of depth of field on the far position side obtained in the far position observation state (I). Since it is desired to obtain an observation range as large as possible on the near position side, however, it is desirable to make the range of depth of field on the far position side in the near position observation state uniform (II) with the range of depth of field at the far position in the far position observation state (II). This is visualized in FIG. 15. In order to realize the state illustrated in FIG. 15, it is sufficient to determine the focal lengths of the double-focal-point lens while selecting NA in such a manner that an object located at the far position in the near position observation state (II) will form a confusion circle of the same size as that on the image plane formed by an object located at the far position in the far position observation state (I) as illustrated in FIGS. 16A, 16B and 16C. When the stop capable of changing aperture size in two steps is used and the far position of the depth of field obtained by using the ring-shaped stop (far position observation state (I)) is made uniform with the far position of the depth of field obtained by using the central portion (near position observation state (II), the far position of the depth of field is not changed and the quantity of light can be increased by fully opening the stop (state (III)). An object located at a position nearer than that observable with the conventional automatic iris control device can then be observed by stopping down the stop or using the central circular portion of the stop. The Embodiment 3 corresponds to the above-described Embodiment 2 which is set for observation of the far position by making the central circular portion transparent. For the numerical data on the lens, reference should be made to the Embodiment 2. Only depths of field are listed below:

| | |
|---|---|
| Far position observation state (NA' 0.25) | 8.86~40.15 mm |
| Near position observation state (NA' 0.10) | 3.66~40.36 mm |

Since the central portion of the stop 21 is always kept transparent in the Embodiment 3, it is sufficient to design the stop in such a manner that only the circumferential portion or the ring-shaped portion thereof can be switched between the transparent and light-shielding conditions, thereby making it possible to simplify the composition of the stop.

Figure 17:
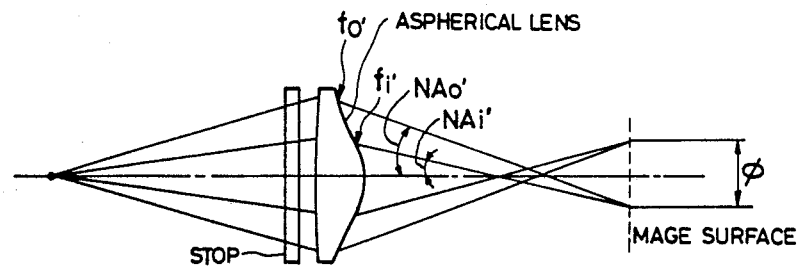
Figure 17:
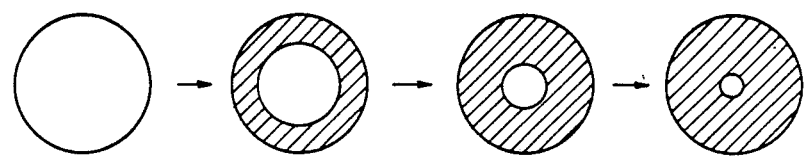
Figure 18:
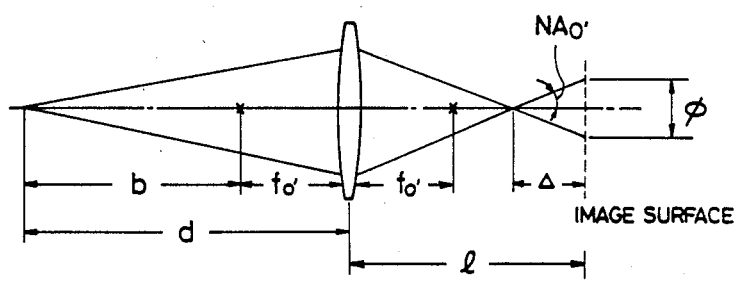

Further, it is conceivable to design an objective system using a stop capable of continuously varying aperture size in place of the stop capable of switching aperture size in two steps, and a lens capable of continuously varying focal length thereof instead of the double-focal-point lens. Also in this case, it is necessary to vary focal length continuously in conjunction with NA' values as shown in FIG. 17 so as to reserve sufficient depth of field on the far position side like the case of the double focal point type. For this purpose, the lens should be of a non-spherical type. When a ray having the maximum NA' and emitted from an object located at the far position produces blurring of a confusion circle having a diameter $\phi$ on the image plane, the depth of field on the far position side of the ray having each NA' value is equal to that of the ray having the maximum NA' value in the condition that the ray having each NA' value passes through the intersect of the ray having the maximum NA' value with the image plane and forms a confusion circle having a diameter $\phi$. When a ray having an NA' value smaller than the maximum NA' passes across the optical path and then produces blurring of a confusion circle having a diameter smaller than $\phi$, the depth of field at the far position is shallower than that of the ray having the maximum NA' value. FIG. 18 visualizes the relationship between each NA' value and focal length f' for each ray on the basis of a condition that the depth of field at the far position is always constant for the rays having different NA' values.

Let us designate a ray having the maximum NA' value or passing through the outermost circumference of the stop and the outermost circumference of the lens by $NA_0'$. Let us further designate the distance to the far position for the ray $NA_0'$ by d. Let us assume that the lens system is composed of a thin lens and confusion circle has a diameter of $\phi$. Let us further denote focal length of the lens surface portion through which the ray $NA_0'$ passes by $f_0'$. Then, distance l as measured from the lens to the image plane is determined as follows:

$$l = f_0' + \beta_0 f_0' + \Delta \quad (1)$$
$$= f_0' + \frac{f_0'^2}{d} + \frac{\phi}{2 \cdot NA_0'}$$

Further, distance d to an object conjugate with the image plane is determined by the following formula:

$$d = f + b = f + f \cdot \frac{1}{\beta}$$
$$= f + f \cdot \frac{f}{(l - f)}$$
$$\therefore d = \frac{l \cdot f}{l - f} \quad (2)$$

Since the lens surface portion through which the ray $NA_0'$ having the maximum NA' value has the focal length $f_0'$, the location of an object forming the most favorable image with the ray passing through this lens surface portion can be obtained by using $f_0'$ in place of f'.

On the other hand, in order to keep the depth of field on the far position side constant, determined by focal length $f_i$ of the lens surface portion through which the ray having $NA_i$ value passes, for the ray having an optional $NA_i$ smaller than the maximum NA' of the ray $NA_0'$, the following formula (3) must have a constant value:

$$l = f_i + \frac{f_i^2}{d} + \frac{\phi}{2} \cdot \frac{1}{NA_i} \quad (3)$$

Since the value of l is determined by the ray $NA_0'$ having the maximum NA' value and the depth of field on the far position side is assumed to be constant, d has a constant value. Therefore, the value of $f_i$ is determined by giving a value of $NA_i$. The formula (3) is transformed into the following formula (4):

$$f_i = -\frac{b}{2} + \sqrt{\frac{b^2}{2} + b \cdot l - b \cdot \frac{\phi}{2} \cdot \frac{1}{NA_i}} \quad (4)$$

Then, let us assume a concrete example of a thin lens having an F number of 2 (NA=0.25), a focal length of 1 mm (for a ray having an F number of −2), a far position of 40 mm and a diameter of confusion circle of 20 μm. In this case, l is calculated as follows:

$$\beta = \frac{1}{40-1}$$

$$l = f + \beta \cdot f + \Delta = f + \frac{f^2}{d} + \frac{\phi}{2 \cdot NA}$$

$$\therefore l = 1.065641026$$

On an assumption that this is applicable to an optional $NA_i'$ (smaller than 0.25), the following formula must be satisfied:

$$1.065641026 = f_i + \frac{f_i^2}{40-1} + \frac{0.01}{NA_i'}$$

Hence, $$f_i = -19.5 \pm \sqrt{421.81 - \frac{0.39}{NA_i'}}$$

At $NA_i'=0.25$, for example, $f_i=1$ is obtained.

Listed below is relationship of $f_i$ versus $NA_i'$ as calculation examples in a case where curvature of lens surface is continuously varied in conjunction with NA' by using a non-spherical lens:

| NA' | Focal length f (mm) | Most favorable distance from objective (mm) | Far position (mm) | Near position (mm) |
|---|---|---|---|---|
| 0.25 | 1 | 16.23 | 40 | 10.46 |
| 0.20 | 0.990 | 14.04 | 40 | 8.82 |
| 0.15 | 0.970 | 11.41 | 40 | 6.97 |
| 0.10 | 0.940 | 8.18 | 41.09 | 4.92 |
| 0.05 | 0.840 | 4.13 | 50.46 | 2.52 |

Calculation examples in a case where quantity of light is controlled by a single-focal-point lens

| NA' | Focal length f (mm) | Most favorable distance from objective (mm) | Far position (mm) | Near position (mm) |
|---|---|---|---|---|
| 0.25 | 1 | 16.23 | 40 | 10.46 |
| 0.20 | 1 | 16.23 | 64.9 | 9.64 |
| 0.15 | 1 | 16.23 | ∞ | 8.55 |
| 0.10 | 1 | 16.23 | ∞ | 7.03 |
| 0.05 | 1 | 16.23 | ∞ | 4.76 |

All the depths of field listed above are assumed to be obtainable with a thin lens designed for a diameter of confusion angle of 20 μm, $f_F = -f$ and a depth of field at the far position of 40 mm at NA=0.25.

Now, modifications of the embodiments will be described below.

Figure 19A:
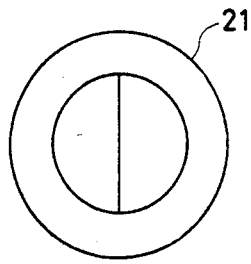
FIGS. 19A, 19B, 19C, 19D, 19E, 20, 21, 22A, 22B, 22C and 22D are front elevations and sectional views illustrating main parts of modifications.
Figure 19B:
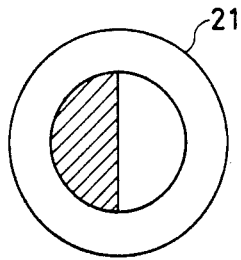
Figure 19C:
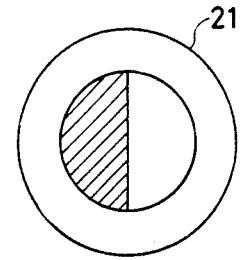
Figure 19D:
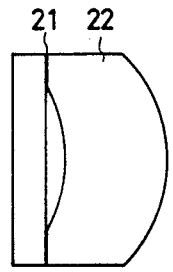
Figure 19E:
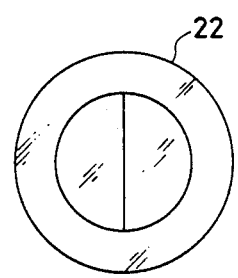

FIGS. 19A through 19E show a stop 21 which is not divided into concentrical circles but into semicircular shapes. FIGS. 19B and 19C illustrate the operating states corresponding to the above-described states (I) and (II) respectively. FIG. 19D shows a side view, whereas FIG. 19E illustrates a lens 22 having different radii of curvature on the right and left side surfaces thereof corresponding to the shapes of the stop 21.

Figure 20:
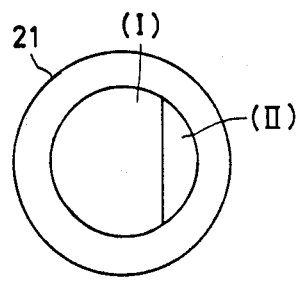
Figure 21:
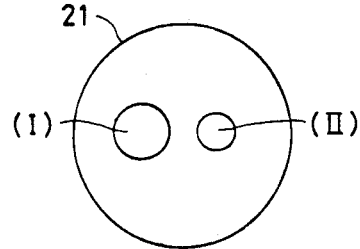

FIG. 20 shows a case wherein said divided type of stop is divided into optimum unequal sections, whereas FIG. 21 illustrates a stop consisting of two independent circles which are alternately set in transparent and light-shielding conditions. For use with these stops, the lens 22 must have radii of curvature varying correspondingly to the shapes of the individual stop portions.

Figure 22A:
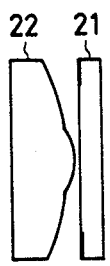
Figure 22B:
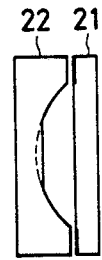
Figure 22C:
Figure 22D:

FIGS. 22A through 22D show modified arrangements of the stop 21 and lens 22. FIG. 22A exemplifies a case where the double-focal-point lens 22 is arranged before the stop 21 and the convex surface of the lens 22 faces the stop 21. FIG. 22B shows an arrangement, similar to that illustrated in FIG. 22A, where the concave surface of the lens 22 faces the stop 21. Whereas FIG. 22C and FIG. 22D illustrate examples of cases where the stop 21 is arranged before the lens 22 and the flat surface of the lens 22 faces the stop 21. In each of these examples, the lens 22 is designed in such a manner that the central portion thereof has a stronger converging function than the circumferential portion thereof. Now, application examples will be described below.

Figure 23:
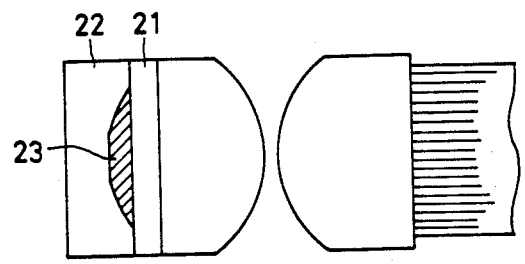
FIGS. 23, 24, 25, 26 and 27 are sectional views illustrating main parts of applicational examples.

FIG. 23 shows a different type of objective system for endoscopes wherein a concave surface of a front concave lens 22 has multiple focal lengths, and the space between said lens and the stop 21 is filled with a substance (air, adhesive agent, etc.) having a refractive index smaller than that of the material of the lens 22. Operations of this objective system are quite the same as those of the Embodiment 1 and will not be described.

Figure 24:
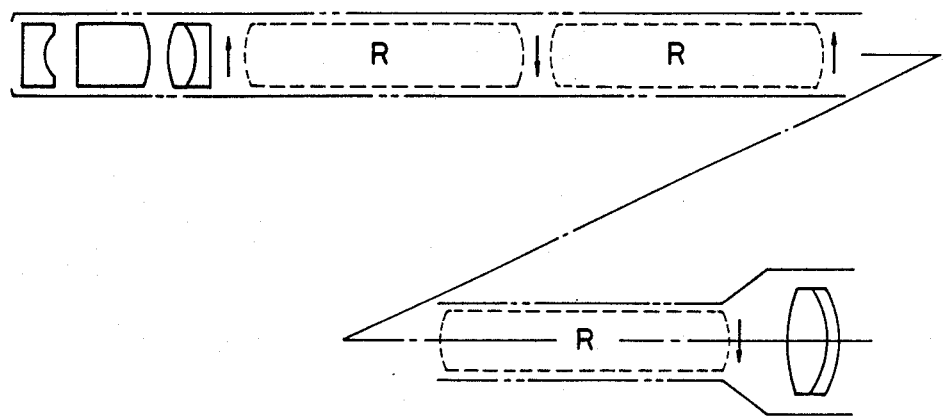
Figure 25:
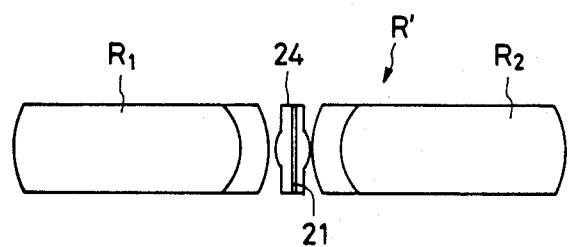

FIG. 24 presents an example wherein the Embodiment 3 is applied in a relay lens system of a hard scope. Speaking concretely, in the relay lens system wherein an image is transmitted through three relay lens systems, any one of the three relay lens systems can be replaced with a relay system R' having the composition shown in FIG. 25. That is to say, the relay system R' comprises a biconvex lens 24 having a flat circumferential surface, and a central convex surface with a small radius of curvature, comprising a variable stop 21 and arranged between a pair of relay lenses $R_1$ and $R_2$. In addition, it is possible in this relay lens system R' to arrange the variable stop 21 between the pair of relay lenses $R_1$ and $R_2$, and design the surfaces of the relay lenses $R_1$ and/or $R_2$ facing the stop 21 so as to have multiple focal points.

Figure 26:
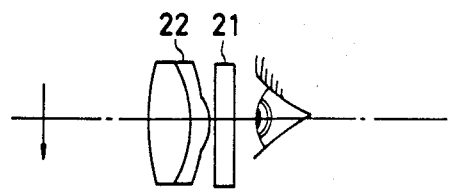

FIG. 26 exemplifies a case wherein the Embodiment 3 is applied in the eyepiece lens system for observation on a magnified scale of an image transmitted through the relay lens system in the hard endoscope described above.

Figure 27:
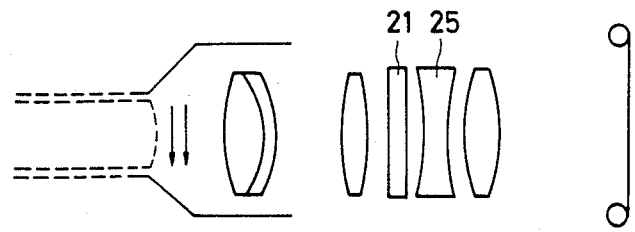
Figure 28A:
FIGS. 28A, 28B, 28C, 28D, 29A, 29B, and 29C are sectional views illustrating other modifications different from each other.
Figure 28B:
Figure 28C:
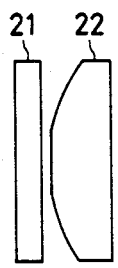
Figure 28D:
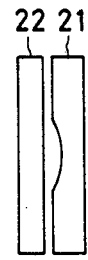

FIG. 27 shows an example wherein the Embodiment 3 is attached to an eyepiece of the hard endoscope for applying said embodiment as an adapter for photographing. This application is realized by arranging the variable stop 21 so as to be located in a triplet lens component and designing a concave lens so as to have multiple focal points.

All the embodiments described above are composed in such a manner that the central circular portion and the ring-shaped portion surrounding said circular portion can be made transparent alternatively, and the flux of the rays passing through the central circular position is thinned to focus the objective system on the side of the near position for observing the near position. However, in order to satisfy a different desire to obtain a very shallow depth of field for observing an object located close to the objective system while eliminating background image, it is conceivable to adopt a composition wherein the lens 22 has a strong converging function at the circumferential portion thereof as shown in FIGS. 28A through 28D.

Figure 29A:
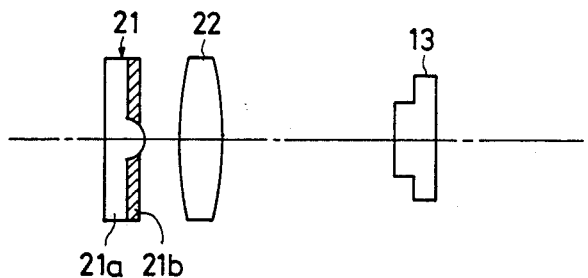
Figure 29B:
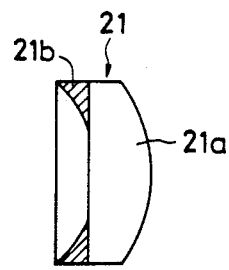
Figure 29C:
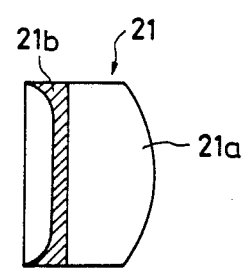

Though the lens element 22 neighboring the variable stop 21 is designed as a multi-focal-point lens in all the embodiments described above, it is possible to modify in such a manner that the portions of the variable stop 21 have different refractive indices and use an ordinary lens as the lens element 22. That is to say, in the embodiment illustrated in FIG. 29, the stop 21 consists of a transparent element 21a having a protruded central portion and a flat circumferential portion, and a ring-shaped electrochromic element 21b overlapped with said flat portion, and the electrochromic element 21b is set transparent or light-shielding condition by using the driving circuit described above. FIG. 29B shows an example wherein the electrochromic element is designed in the lens shape. Speaking concretely, the electrochromic element 21b, having a curved surface to form a portion of the ring-shaped concave surface, is cemented to the ordinary lens 21a. When the electrochromic element 21b is set in the transparent condition to form only the circumferential portion into a meniscus shape, the circumferential portion has a refracting power weaker than that of the flat central portion, thereby producing the same effect as the objective system using a double-focal-point lens. In order to design the central portion also to be settable in the transparent and light-shielding conditions in this case, it is sufficient to use the electrochromic element 21b having the shape shown in FIG. 29C.

Figure 30:
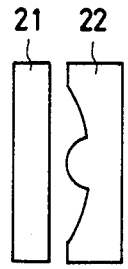
FIG. 30 illustrating another modification of the lens configuration.

In all the embodiments described above, it is desirable to form the boundary regions between the portions having different radii of curvature on the same lens surface so as to have continuously varying curvature. Further, though the apertures of the stops and outer profiles of the lenses are assumed to be circular in all the embodiments, these shapes can be modified into rectangles, ellipses, etc. in accordance with the shapes of the image receiving surfaces (end surface of the image guide and sensitive surface of the image sensor). Further, the lens may have a convex surface on the central portion (having positive refractive power) and a concave surface on the circumferential portion (having negative refractive power as shown in FIG. 30. Other conceivable shapes of the lens are also included within the concept of the present invention.

What is claimed is:

1. An optical system for endoscopes comprising:
   stop means having an aperture and including means for varying an area of the aperture thereof, and
   a lens system having a lens component arranged in the vicinity of or conjugate with said stop means, said lens having a plurality of lens surface portions corresponding to the areas of the varied apertures of said stop means, each said portion having a different focal length from each other said portion.

2. An optical system for endoscopes according to claim 1 wherein said stop means and said lens component are fixed in a direction along an optical axis of said lens component.

3. An optical system for endoscopes according to claim 2 wherein said stop means includes a central portion and an annular portion surrounding said central portion so as to vary the aperture of said stop means by setting said central portion and said annular portion in transparent and light-shielding conditions alternatively, said lens component including a first portion having a first focal length corresponding to the central portion of said stop means and a second portion having a second focal length different from that of said first portion and corresponding to said annular portion, and said lens system having a shorter focal length for the ray passing through said central portion than the focal length for the ray passing through said annular portion.

4. An optical system for endoscopes according to claim 3 wherein the central portion includes a center coinciding with the optical axis of said lens component.

5. An optical system for endoscopes according to claim 3 wherein said lens component includes an aspherical surface having refractive power varying in the direction from the optical axis toward the circumference thereof.

6. An optical system for endoscopes according to claim 3 wherein said lens component is a positive lens and said first portion has a refractive power stronger than that of said second portion.

7. An optical system for endoscopes according to claim 3 wherein said lens component is a negative lens and said first portion has a refractive power weaker than that of said second portion.

8. An optical system for endoscopes according to claim 3 wherein one surface of said lens component is convex and the curved surface corresponding to said first portion has a radius of curvature smaller than that of the curved surface corresponding to said second portion.

9. An optical system for endoscopes according to claim 3 wherein one surface of said lens component is concave and the curved surface corresponding to said first portion has a radius of curvature larger than that of the curved surface corresponding to said second portion.

10. An optical system for endoscopes according to claim 3 wherein the area of the central portion of said stop means is smaller than that of the annular portion.

11. An optical system for endoscopes according to claim 1 wherein said stop means has at least a first aperture and a second aperture having an area larger than that of said first aperture, the portion of said lens component corresponding to said first aperture has a first focal length, the portion of said lens component corresponding to said second aperture has a second focal length, and the focal length of said lens system for the ray passing through said first aperture is shorter than the focal length of said lens system for the ray passing through said second aperture.

12. An optical system for endoscopes according to claim 3 wherein said central portion has a composition transmissive of light and said stop means includes means for varying the aperture of said stop means by setting said annular portion in the transparent and light-shielding conditions selectively.

13. An optical system for endoscopes according to claim 3 wherein said central portion and said annular portion are transparent and light-shielding, alternatively.

14. An optical system for endoscopes according to claim 1 wherein an annular light-shielding portion is interposed between said central portion and annular portion of said stop means.

15. An optical system for endoscopes according to claim 3 wherein said second portion has no refractive power and said second portion has a positive refractive power.

16. An optical system for endoscopes according to claim 3 wherein the surface portion on one surface of said lens component corresponding to said second portion is flat and the surface portion on one surface of said lens component corresponding to said first portion is convex.

17. An optical system for endoscopes according to claim 3 wherein said stop means has a plurality of concentric annular portions.

18. An optical system for endoscopes according to claim 17, wherein said lens component includes portions having focal lengths different from each other and corresponding to said annular portions.

19. An optical system for endoscopes according to claim 17 wherein said lens component includes a nonspherical surface having refractive power varying in the direction from the optical axis toward the circumference thereof.

20. An optical system for endoscopes according to claim 3 wherein said stop means is for varying the stop aperture continuously and coaxially with the optical axis.

21. An optical system for endoscopes according to claim 20 wherein said lens component includes an aspherical surface having refractive power varying in the direction from the optical axis toward the circumference thereof.

22. An optical system for endoscopes according to claim 2 wherein said stop means includes a plurality of aperture portions, said stop means also for varying the aperture of said stop means by setting the plurality of apertures in the transparent and light-shielding conditions alternatively, and said lens component includes portions having focal lengths different from each other and corresponding to the plurality of apertures of said stop means.

23. An optical system for endoscopes according to claim 20 wherein the plurality of apertures of said stop means consist of semicircular sections having the same radius.

24. An optical system for endoscopes according to claim 11 or 20 wherein the plurality of apertures of said stop means consist of sections having different areas and are so divided as to form a circle.

25. An optical system for endoscopes according to claim 11 or 20 wherein said first and second apertures consist of two independent circular sections.

26. An optical system for endoscopes according to claim 7 wherein said first portion is powerless.

27. An optical system for endoscopes according to claim 12 or 13 wherein the far position of the depth of field in the state where said annular portion is set in the transparent condition is located substantially at the same position as the far position of the depth of field in the state where said annular portion is set in the light shielding condition.

28. An optical system for endoscopes according to claim 12 or 13 wherein the far position of the depth of field in the state where said annular portion is set in the light-shielding condition is located within the range of the depth of field in the state where said annular portion is set in the transparent condition.

29. An optical system for endoscopes according to claim 2 further including a substance having a refractive index smaller than that of the material of said lens component, the substance disposed between said lens component and said stop means.

30. An optical system for endoscopes according to claim 2 wherein said lens system is an objective lens arranged in the distal end of an endoscope.

31. An optical system for endoscopes according to claim 2 wherein said lens system is a relay lens system for transmitting an image formed by an objective lens to a system arranged after said objective lens.

32. An optical system for endoscopes according to claim 2 wherein said lens system is arranged after an eyepiece of an endoscope and functions as an objective lens of a photographing device for photographing an object image transmitted through the endoscope.

33. An optical system for endoscopes according to claim 2 wherein said lens system is an eyepiece of an endoscope.

34. An optical system for endoscopes according to claim 2, further including a cement layer securing said stop means to said lens component.

* * * * *